United States Patent
Cariou et al.

(10) Patent No.: US 11,483,034 B2
(45) Date of Patent: *Oct. 25, 2022

(54) METHODS AND APPARATUS FOR MULTI-DESTINATION WIRELESS TRANSMISSIONS

(71) Applicant: Intel IP Corporation, Santa Clara, CA (US)

(72) Inventors: Laurent Cariou, Portland, OR (US); Carlos Cordeiro, Portland, OR (US); Assaf Kasher, Haifa (IL); Solomon Trainin, Haifa (IL); Chittabrata Ghosh, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,811

(22) Filed: Mar. 2, 2020

(65) Prior Publication Data

US 2021/0028825 A1  Jan. 28, 2021

Related U.S. Application Data

(63) Continuation of application No. 16/009,191, filed on Jun. 14, 2018, now Pat. No. 10,581,493, which is a (Continued)

(51) Int. Cl.
*H04B 7/0408*  (2017.01)
*H04B 7/0491*  (2017.01)
(Continued)

(52) U.S. Cl.
CPC ......... *H04B 7/0408* (2013.01); *H04B 7/0491* (2013.01); *H04B 7/0617* (2013.01);
(Continued)

(58) Field of Classification Search
CPC ....... H04B 7/02–12; H04L 5/0001–26; H04W 4/06–08; H04W 16/28;
(Continued)

(56) References Cited

U.S. PATENT DOCUMENTS 5,666,653 A   9/1997 Ahl
9,451,474 B2  9/2016 Bhanage
(Continued)

OTHER PUBLICATIONS

Dawui et al., "Multiuser-Mimo Downlink TX-RX Design Based on SVD Channel Diagonalization and Multiuser Diversity," Eurecom Institute, Sophia Antipolis Cedex, France, Oct. 2005, 5 pages. (document available in U.S. Appl. No. 16/009,191. Applicant will provide document upon request from Examiner.).

(Continued)

*Primary Examiner* — Timothy J Weidner
(74) *Attorney, Agent, or Firm* — Hanley, Flight & Zimmerman, LLC

(57) ABSTRACT

Methods and apparatus for multi-destination wireless transmissions as disclosed. An example multi-destination transmitter includes a direction determiner to determine directions for wireless transmission of data to destination devices and a transmission handler to: select a subset of the destination devices that are associated with different ones of a plurality of antennas as indicated by the directions determined by the direction determiner; and transmit the data to the subset of the destination devices via the plurality of antennas.

20 Claims, 6 Drawing Sheets

Related U.S. Application Data continuation of application No. 14/757,738, filed on Dec. 23, 2015, now Pat. No. 10,027,385.

(51) Int. Cl.
| | |
|---|---|
| *H04B 7/06* | (2006.01) |
| *H04B 7/10* | (2017.01) |
| *H04W 4/06* | (2009.01) |
| *H04W 16/28* | (2009.01) |
| *H04W 72/04* | (2009.01) |
| *H04W 84/12* | (2009.01) |
| *H04W 88/02* | (2009.01) |
| *H04W 88/08* | (2009.01) |
| *H04W 92/10* | (2009.01) |

(52) U.S. Cl.
CPC ............ *H04B 7/0695* (2013.01); *H04B 7/10* (2013.01); *H04W 4/06* (2013.01); *H04W 16/28* (2013.01); *H04W 72/046* (2013.01); *H04W 84/12* (2013.01); *H04W 88/02* (2013.01); *H04W 88/08* (2013.01); *H04W 92/10* (2013.01)

(58) Field of Classification Search
CPC ... H04W 48/02–20; H04W 72/005–14; H04W 74/002–0891; H04W 84/005; H04W 84/02; H04W 84/04–22; H04W 88/02; H04W 88/04–12; H04W 92/04; H04W 92/10; H04W 92/12; H04W 92/16–22
See application file for complete search history.

(56) References Cited

U.S. PATENT DOCUMENTS

| | | | | |
|---|---|---|---|---|
| 10,027,385 | B2* | 7/2018 | Cariou | H04W 72/046 |
| 10,581,493 | B2* | 3/2020 | Cariou | H04W 72/046 |
| 2014/0009338 | A1* | 1/2014 | Lin | H04W 16/28 |
| 2014/0072078 | A1* | 3/2014 | Sergeyev | H04B 7/0408 |
| 2016/0081139 | A1* | 3/2016 | Akhavan-Saraf | H04W 72/0453 |
| 2016/0309396 | A1* | 10/2016 | Chai | H04W 16/28 |
| 2017/0078004 | A1 | 3/2017 | Capar et al. | |
| 2017/0134913 | A1 | 5/2017 | Cui et al. | |
| 2018/0255537 | A1 | 9/2018 | Park et al. | |

OTHER PUBLICATIONS

Maltsev et al., "Channel Models for IEEE 802.11ay," IEEE doc 802.11-09/0334r80, Intel Corporation, Sep. 2015, 28 pages. (document available in U.S. Appl. No. 16/009,191. Applicant will provide document upon request from Examiner.).

Maltsev et al., "Extension of Legacy IEEE 802.11ad Channel Models for MIMO and Channel Bonding," IEEE doc go2.11-15/1356r1, Intel Corporation, Nov. 2015, 31 pages. (document available in U.S. Appl. No. 16/009,191. Applicant will provide document upon request from Examiner.).

Venkatesan et al., "TGay Evaluation Methodology," IEEE doc P802.11-09/0296r16, Intel Corporation, Jul. 2015, 22 pages. (document available in U.S. Appl. No. 16/009,191. Applicant will provide document upon request from Examiner.).

Maltsev, "SU-MIMO Configurations for IEEE 802.11ay," IEEE doc_ 802.11-15-1145r0, Intel Corporation, Sep. 2015, 14 pages. (document available in U.S. Appl. No. 16/009,191. Applicant will provide document upon request from Examiner.).

United States Patent and Trademark Office, "Non-Final Office Action," issued in connection with U.S. Appl. No. 14/757,738, dated Sep. 15, 2017, 17 pages. (Applicant will provide focument upon request from Examiner.).

United States Patent and Trademark Office, "Notice of Allowance," issued in connection with U.S. Appl. No. 14/757,738, dated Mar. 14, 2018, 5 pages. (Applicant will provide document upon request from Examiner.).

United States Patent and Trademark Office, "Non-Final Office Action," issued in connection with U.S. Appl. No. 16/009,191, dated Jun. 26, 2016, 7 pages. (Applicant will provide document upon request from Examiner.).

United States Patent and Trademark Office, "Notice of Allowance," issued in connection with U.S. Appl. No. 16/009,191, dated Oct. 23, 2019, 5 pages. (Applicant will provide document upon request from Examiner.).

\* cited by examiner

METHODS AND APPARATUS FOR MULTI-DESTINATION WIRELESS TRANSMISSIONS

RELATED APPLICATIONS

This patent arises from a continuation of U.S. patent application Ser. No. 16/009,191, entitled METHODS AND APPARATUS FOR MULTI-DESTINATION WIRELESS TRANSMISSIONS, filed Jun. 14, 2018, which arises from a continuation of U.S. patent application Ser. No. 14/757,738, entitled METHODS AND APPARATUS FOR MULTI-DESTINATION WIRELESS TRANSMISSIONS, filed Dec. 23, 2015. U.S. patent application Ser. Nos. 16/009,191 and 14/757,738 are hereby incorporated by reference herein in its entirety.

FIELD OF THE DISCLOSURE

This disclosure relates generally to wireless transmissions, and, more particularly, methods and apparatus for multi-destination wireless transmissions.

BACKGROUND

In some wireless communication systems, a wireless device includes multiple antennas to facilitate omnidirectional transmissions for communication with other devices. For example, in some International Electrical and Electronics Engineer (IEEE) 802.11 protocols (e.g., 802.11ac), multiple antennas may be utilized to facilitate multiple input multiple output (MIMO) data transmissions. MIMO refers to the technique of simultaneously sending/receiving more than one data signal on a radio channel via multipath propagation from multiple antennas. Utilizing multiple antennas provides increased communication range as compared with a single omnidirectional antenna.

DETAILED DESCRIPTION

Figure 1:
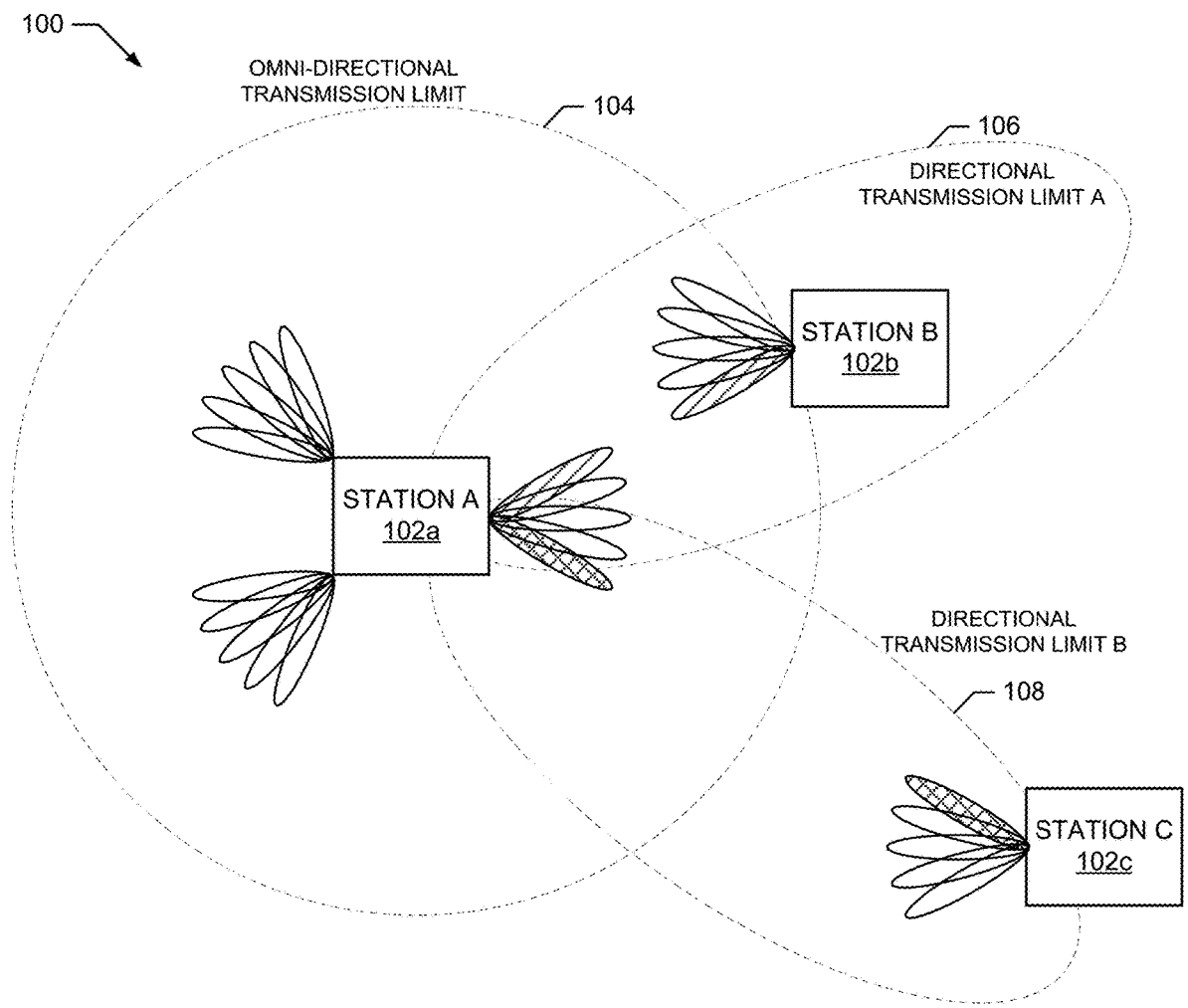
FIG. 1 is a block diagram of an example system in which a first station communicates with a second station and a third station.

As used herein, a station is any type of device that includes wireless communication capabilities. For example, a station may be an access point, a router, a mobile device, a computer, a laptop, etc. FIG. 1 is a block diagram of an example system 100 in which a first station A 102a communicates with a second station B 102b and a third station C 102c.

Wireless communication systems, such as the example system 100, often encounter instances in which a station (e.g., the station A 102a) is to transmit (e.g., broadcast) a data packet that is to be received by multiple stations (e.g., the station B 102b and the station C 102c). In many instances, the omnidirectional transmission limit of 2.4 GHz and 5 GHz wireless systems is acceptable. However, when transitioning to higher frequency bands (e.g., 60 GHz and greater) the omnidirectional transmission limit often becomes small enough that the use of omnidirectional transmissions in impractical. For example, as illustrated by the example omnidirectional transmission limit 104 of FIG. 1, if station A 102a were to broadcast a data packet using omnidirectional transmission, the transmission would reach the station B 102b, but would not reach the station C 102c.

Example methods and apparatus disclosed herein implement a new multi-destination control physical layer (PHY) mode to facilitate a station simultaneously transmitting information to multiple other stations. A station may transmit the same information to multiple stations or may transmit different information to each of multiple stations. As used herein, simultaneously transmitting the information includes transmitting substantially simultaneously, transmitting two or more transmissions at least partially overlapping in time, etc.

As illustrated by example directional transmission limit A 106 directed to the example station B 102b and example directional transmission limit B 108, by simultaneously, directionally transmitting data utilizing a multi-destination PHY mode, as disclosed herein, methods and apparatus disclosed herein facilitate extended range as compared with, for example, omnidirectional transmission without the delay incurred by discrete directional transmissions.

Figure 2:
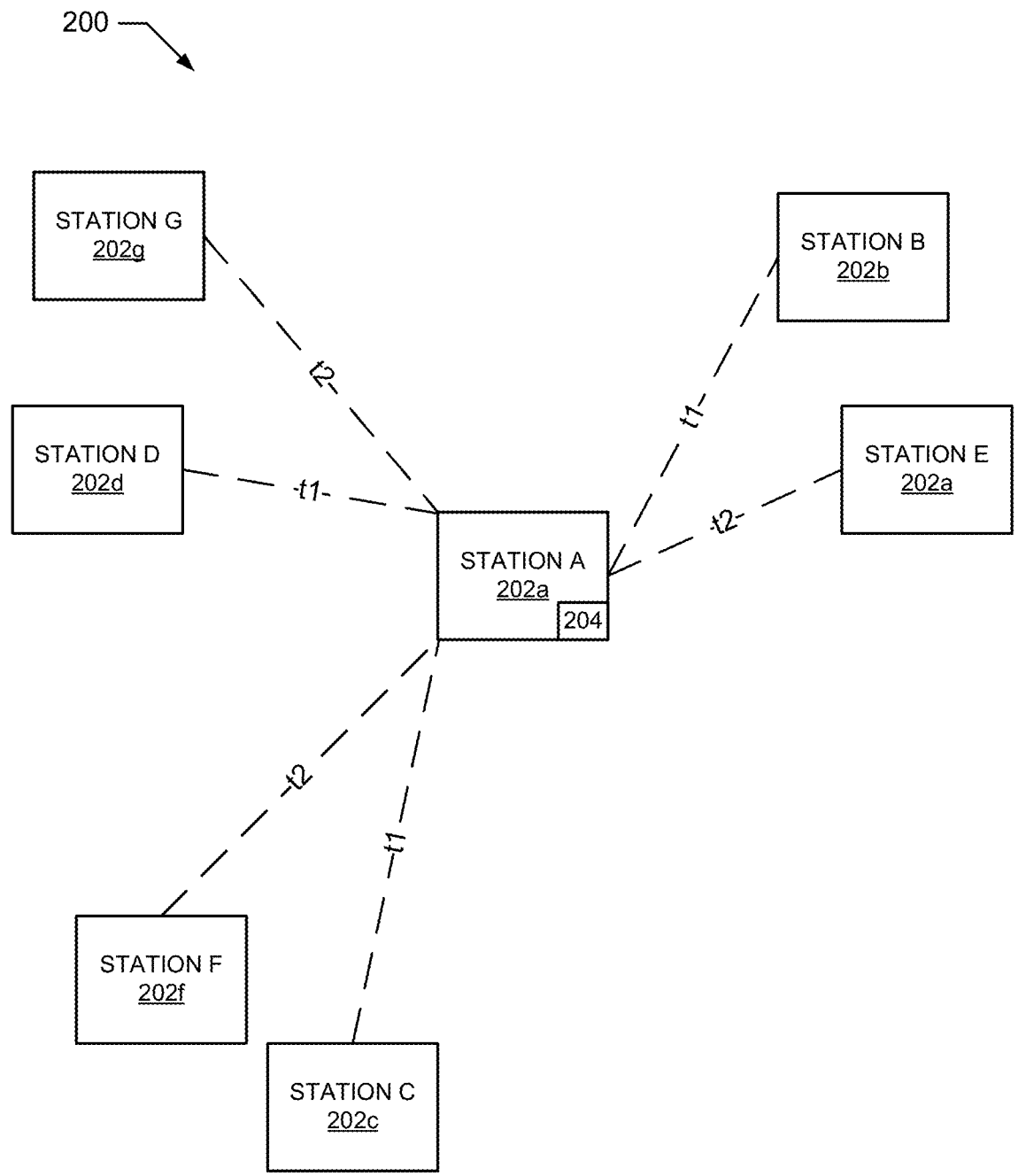
FIG. 2 is a block diagram of an example system in which a first station includes a multi-destination transmitter for communicating with other stations.

FIG. 2 is a block diagram of an example system 200 in which a first station A 202a includes a multi-destination transmitter 204 to transmit information to a second station B 202b, a third station C 202c, a fourth station D 202d, a fifth station E 202e, a sixth station F 202f, and a seventh station G 202g.

The first station A 202a of the illustrated example is an access point. For example, the first station A 202a may be commutatively coupled with a network (e.g., the Internet) to communicatively couple the other stations 202b-202g to the network. Alternatively, the first station A 202a may be any other type of communication device. According to the illustrated example, the example first station A 202a includes three antennas for communicating with other devices. Alternatively, the first station A 202a may include any number of antennas.

The example second station B 202b, the example third station C 202c, the example fourth station D 202d, the example fifth station E 202e, the example sixth station F 202f, and the example seventh station G 202g may be any type of communication device that communicates with the with the example first station A 202a.

Returning to the first station A 202a, the example multi-destination transmitter 204 implements a multi-destination PHY mode for IEEE 802.11ay, 60 GHz simultaneous communication with multiple devices (e.g., the example second station B 202b, the example third station C 202c, the example fourth station D 202d, the example fifth station E 202e, the example sixth station F 202f, and the example seventh station G 202g). The example multi-destination transmitter 204 determines, based on the direction of the multiple devices 202b-202g, a group(s) of devices 202b-202g to which information can be simultaneous transmitted utilizing separate antennas and/or separate antenna sectors without utilizing omnidirectional transmission.

According to the illustrated example, the example multi-destination transmitter 204 determines that information can be simultaneously transmitted to the example second station B 202b, the example third station C 202c, and the example fourth station D 202d because different antennas and/or antenna sectors can be utilized for communicating with each of the example stations 202b-202d. Likewise, the example multi-destination transmitter 204 determines that information can be simultaneously transmitted to the example fifth station E 202e, the example sixth station F 202f, and the example seventh station G 202g because different antennas and/or antenna sectors can be utilized for communicating with each of the example stations 202e-202g. Thus, according to the illustrated example, the example multi-destination transmitter 204 simultaneously transmits to the example second station B 202b, the example third station C 202c, and the example fourth station D 202d at a first time t1 and transmits to the example fifth station E 202e, the example sixth station F 202f, and the example seventh station G 202g at a second time t2.

The example multi-destination transmitter 204 may simultaneously transmit the same information to multiple destinations, may simultaneously transmit different information to different destinations, and/or any combination of the same information and different information.

For example, when the multi-destination transmitter 204 receives a first packet of information to be transmitted to the example second station B 202b, a second packet of information to be transmitted to the example third station C 202c, and a third packet of information to be transmitted to the example fourth station D 202d, the example multi-destination transmitter 204 first simultaneously transmits a control signal (e.g., the same information) to each of the example second station B 202b, the example third station C 202c, and the example fourth station D 202d. For example, the control signal may be a message instructing the example receiving stations 202b-202d to expect to receive a forthcoming data transmission from the example first station A 202a so that the example receiving stations 202b-202d can tune their receivers to receive wireless signals from the direction of the example first station A 202a. After transmitting the control signal to the example receivers 202b-202d, the example multi-destination transmitter 204 simultaneously transmits the example first packet to the example second station B 202b, transmits the example second packet to the example third station C 202c, and transmits the example third packet to the example fourth station D 202d.

Figure 3:
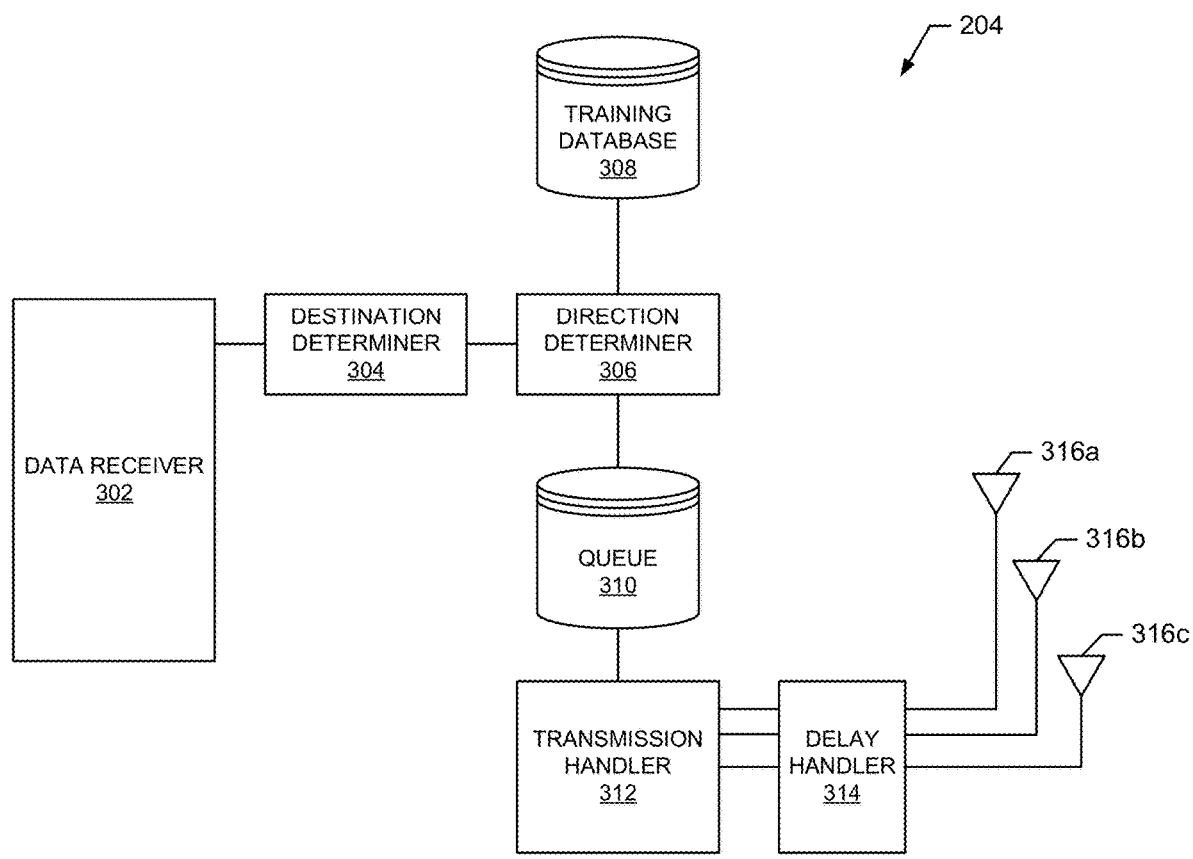
FIG. 3 is a block diagram of an example implementation of the multi-destination transmitter of FIG. 2.

FIG. 3 is a block diagram of an example implementation of the example multi-destination transmitter 204 of FIG. 2. The example multi-destination transmitter 204 of FIG. 3 includes an example data receiver 302, an example destination determiner 304, an example direction determiner 306, an example training database 308, an example queue 310, an example transmission handler 312, an example delay handler 314, and example antennas 316a-316c.

The example data receiver 302 receives data for wireless communication. According to the illustrated example, the data receiver 302 receives data from media access control (MAC) layer components of the example first station A 102a. Alternatively, the data may be received from any component of the example first station A 202a, from a device communicatively coupled with the example first station A 202a, etc. The example data receiver 302 sends the example data to the example destination determiner 304.

The example destination determiner 304 determines a destination device for the example data received via the example data receiver 302. For example, the example destination determiner 304 may extract a destination device name from the example data, may reference destination information included in the example data with a lookup data to determine the identity of the destination device, etc. The example destination determiner 304 sends the example data and an identification of the destination device to the example direction determiner 306.

The example direction determiner 306 determines a direction of the destination device for the example data. According to the illustrated example, the example direction determiner 306 determines the direction of the destination device by accessing a previously generated lookup table stored in the example training database 308. Alternatively, the example direction determiner 306 may initiate and/or perform a direction training process to determine the physical direction of the destination of the example data. The example direction determiner 306 may determine the direction of the destination device as a set of coordinates, a set of values that instruct one or more antennas to beamform a transmission in the direction of the destination device, an identification of one or more of the example antennas 316a-316c to be utilized for communicating with the example destination, etc. The example direction determiner 306 stores the example data and the determined direction information in the example queue 310.

The example training database 308 is a lookup table that stores direction information learned about devices in communication with the example first station A 202a. For example, after the example first station A 202a has performed a training process to determine a direction of a destination device relative to the example first station A 202a, the destination device location and identification information for the destination device are stored in the example training data 308. The example training database 308 may alternatively be a database, a file, a cache, or any other type of data storage.

The example queue 310 is a cache that stores data to be transmitted to other stations. The example queue 310 receives data from the direction determiner 306. The example queue 310 receives requests for data from the example transmission handler 312 and/or pushes the data to the example transmission handler 312. While the example queue 310 is implemented by cache memory, the example queue 310 may alternatively be any other type of data storage such as a file, a buffer, a database, etc.

The example transmission handler 312 retrieves queued data from the example queue 310 for transmission to remote stations (e.g., the example stations 202b-202g of FIG. 2) and controls the timing/order of transmission of the data. According to the illustrated example, the transmission handler 312 determines a group(s) of data that may be simultaneously transmitted. The example transmission handler 312 of FIG. 3 analyzes the location/direction of the destination stations 202b-202g relative to the example first station A 202a to determine the group(s) as a subset of the destination stations 202b-202g that may be transmitted-to using separate ones of the example antennas 316a-316c and/or separate sectors of the example antennas 316a-316c.

For example, the example transmission handler 312 may determine that example first station A 202a will transmit data to the example second station B 202b utilizing the example first antenna 316a, will transmit data to the example third station C 202*c* utilizing the example second antenna 316*b*, and will transmit data to the example fourth station D 202*d* utilizing the example third antenna 316*c*. Accordingly, the example transmission handler 312 determines the example second station B 202*b*, the example third station C 202*c*, and the example fourth station D 202*d* as a group to which data may be simultaneously transmitted.

In addition to determining that stations may be grouped because they may be transmitted-to utilizing different ones of the example antennas 316*a*-316*c* and/or separate sectors of the example antennas 316*a*-316*c*, the transmission handler 312 may analyze other factors in determining how to group transmissions to the example stations 202*b*-202*g*. For example, the example transmission handler 312 may determine that two stations that may be transmitted-to utilizing different ones of the antennas 316*a*-316*c* and/or separate sectors of the example antennas 316*a*-316*c* should not be grouped together if the two stations are located so near each other that the transmissions may interfere with each other, may combine to a beamformed transmission not directed to the two stations, etc.

The example transmission handler 312 transmits the data for the grouped destination stations to the example delay handler 314. According to the illustrated example, the example transmission handler 312 additionally transmits the direction information to the example delay handler 314 to facilitate the example delay handler 314 determining if a delay should be added to any of the signals transmitted via the example antennas 316*a*-316*c* and/or adding a delay to the signals.

The example delay handler 314 determines if a delay should be added to any of the signals to be transmitted via the example antennas 316*a*-316*c* and, if so, adds a delay to the signals. The example delay handler 314 adds an increasing delay to each signal to be simultaneously transmitted to slightly offset the transmissions in time. For example, when the example transmission handler 312 simultaneously transmits data to the example second stations B 202*b*, the example third station C 202*c*, and the example fourth station D 202*d*, the example delay handler 314 will not delay the transmission to the example second station B 202*b*, will add a, for example, 2 nanosecond (ns) delay to the transmission to the third example station C 202*c*, and will add a further 2 ns delay (for a total of 4 ns delay from the first transmission) to the transmission to the example fourth station D 202*d*. While the example delay handler 314 adds a 2 ns delay (e.g., any other delay amount may be utilized. Adding a small delay may reduce the likelihood that the transmissions will interfere with each other (e.g., avoid causing undesired beamforming). According to the illustrated example, the added amount of time added by the delay is significantly shorter than the amount of time for the transmission and, thus, the transmissions to the example second example station B 202*b*, the example third example station C 202*c*, and the example fourth station D 202*d* are simultaneous (e.g., overlapping in time).

The example delay handler 314 determines if a delay is to be added to the signals based on the type of transmission mode. When the example delay handler 314 determines that the same data (e.g., a single frame from a single transmit chain) is being transmitted to multiple destination stations, the example delay handler 314 does not add a delay. In such an example, because the same frame is transmitted in different directions, there will be limited or no interference between the transmission signals. Alternatively, the delay handler 314 may add a delay to transmissions of, for example, the same frame to further reduce the possibility of interference.

Some implementations of the example multi-destination transmitter 204 do not include the delay handler 314 (e.g., where it is known that based, for example, on the locations of the destination stations 202*b*-202*g*, that no delaying is required). In such implementations, the transmission handler 312 transmits the data directly to the example antennas 316*a*-316*c* for transmission to the example destination stations 202*b*-202*g*.

The example multi-destination transmitter 204 includes the example three antennas 316*a*-316*c*. According to the illustrated example, the example antennas 316*a*-316*c* are directional antennas that are arranged to provide substantially omnidirectional wireless transmitting and receiving for the example first station A 202*a*. Alternatively, any other type and/or number of antennas may be utilized (e.g., more antennas, fewer antennas, multi-directional antennas, etc.).

While an example manner of implementing the multi-destination transmitter 204 of FIG. 2 is illustrated in FIG. 3, one or more of the elements, processes and/or devices illustrated in FIG. 3 may be combined, divided, re-arranged, omitted, eliminated and/or implemented in any other way. Further, the example data receiver 302, the example destination determiner 304, the example direction determiner 306, the example training database 308, the example queue 310, the example transmission handler 312, the example delay handler 314, the example antennas 316*a*-316*c* and/or, more generally, the example multi-destination transmitter 204 of FIG. 2 may be implemented by hardware, software, firmware and/or any combination of hardware, software and/or firmware. Thus, for example, any of the example data receiver 302, the example destination determiner 304, the example direction determiner 306, the example training database 308, the example queue 310, the example transmission handler 312, the example delay handler 314, the example antennas 316*a*-316*c* and/or, more generally, the example multi-destination transmitter 204 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data receiver 302, the example destination determiner 304, the example direction determiner 306, the example training database 308, the example queue 310, the example transmission handler 312, the example delay handler 314, the example antennas 316*a*-316*c* and/or, more generally, the example multi-destination transmitter 204 is/are hereby expressly defined to include a tangible computer readable storage device or storage disk such as a memory, a digital versatile disk (DVD), a compact disk (CD), a Blu-ray disk, etc. storing the software and/or firmware. Further still, the example multi-destination transmitter 204 of FIG. 2 may include one or more elements, processes and/or devices in addition to, or instead of, those illustrated in FIG. 3, and/or may include more than one of any or all of the illustrated elements, processes and devices.

Figure 4:
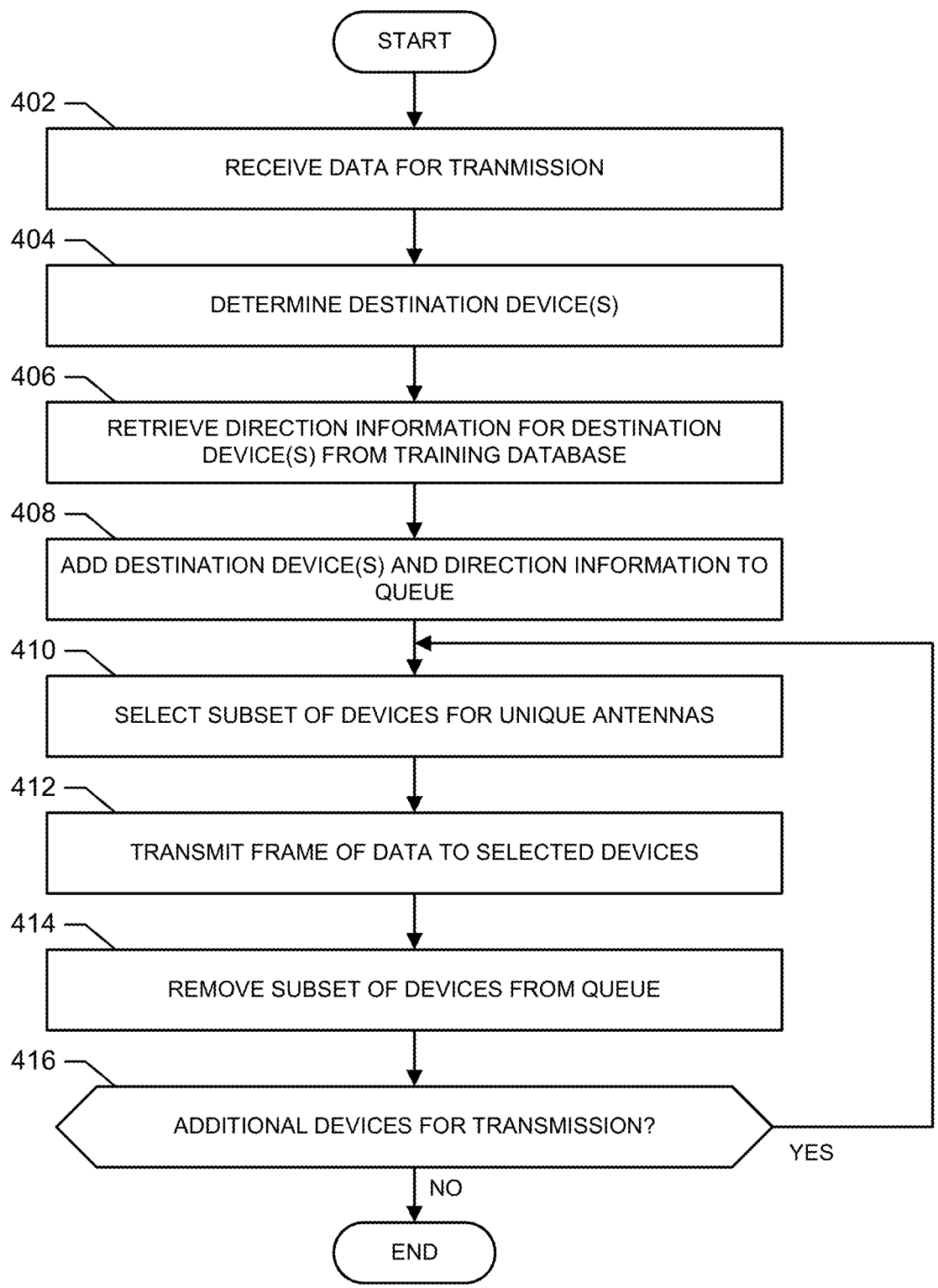
FIG. 4 is a flow diagram representative of example machine readable instructions that may be executed to implement the example multi-destination transmitter of FIGS. 2 and/or 3.

A flowchart representative of example machine readable instructions for implementing the multi-destination transmitter 204 of FIGS. 2 and/or 3 is shown in FIG. 4. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example multi-destination transmitter 204 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process of FIG. 4 begins when the example data receiver 302 of the example multi-destination transmitter 204 receives data for transmission (block 402). For example, the data receiver 302 may receive data from a MAC layer of the example first station A 202*a*. The example destination determiner 304 determines a destination device (e.g., the example second device B 202*b*) for the data (block 404). For example, the example destination determiner 304 may determine a MAC address of the example second device B 202*b* identified in the data (e.g., identified in a packet header associated with the data). The data to be transmitted may be any type of data. For example, the data may be a directional multigigabit (DMG) control PHY frame, a DMG low power single-carrier PHY frame, a DMG single-carrier PHY frame, a DMG orthogonal frequency-division multiplexing (OFDM) PHY frame, an enhanced direction multigigabit (EDMG) control PHY frame, an EDMG single-carrier PHY frame, an EDMG OFDM PHY frame, etc.

After the example destination determiner 304 determines an identification of the destination (e.g., the example second device B 202*b*) for the data (block 404), the example direction determiner 306 accesses the example training database 308 using the identification of the example second device B 202*b* to retrieve a direction for the example second device B 202*b* (block 406). For example, the training database 308 may be populated using known techniques such as, for example, by the first station A 202*a* performing a training process in which the directions and/or antenna information for other stations (e.g., the example stations 202*b*-202*g* are determined and/or measured). The example training database 308 stores a lookup table to translate an identification of a device to a direction for the device (e.g., an identification of an antenna, antenna sector, and/or beamforming parameters for transmitting data in the direction of the device). The example direction determiner 306 adds data with identification of the destination device (e.g., the example second device B 202*b*) and the direction information to the example queue 310. According to the illustrated example, the example queue 310 has already been populated with previously received data for which blocks 402-408 have already been performed. Additionally or alternatively, the data to be transmitted may identify multiple destinations for which the direction determiner 306 determines a direction and adds the information to the example queue 310.

The example transmission handler 312 selects, from the example queue 310, a subset of the destination devices for transmission using unique antennas and/or antenna sectors (e.g., different ones of the example antennas 316*a*-316*c*, different sectors of the example antennas 316*a*-316*c*, etc.) for each device (block 410). For example, the transmission handler 312 may select the example second device B 202*b*, the example third device C 202*c*, and the example fourth device D 202*d* because each of the devices can be transmitted-to using different ones of the example antennas 316*a*-316*c* and/or different sectors of the example antennas 316*a*-316*c*. For example, the transmission handler 312 may determine which devices utilize unique antennas and/or sectors by determining the number of antennas and/or antenna sectors available to the example multi-destination transmitter 204 and analyzing the information stored in the queue 310 to determine a device to be transmitted-to using each of the available antennas 316*a*-316*c* and/or antenna sectors (or a subset of the example antennas 316*a*-316*c* when there is no destination for one or more of the antennas 316*a*-316*c* and/or antenna sectors).

In some examples, the data selected for transmission may be the same data for each of the destinations. In other examples the data selected for transmission may be different data to be transmitted to some or all of the destinations. The data may also be transmitted in two phases (e.g., a first phase during which a control frame is transmitted to each of the destinations to alert the destination that data is about to be transmitted and a second phase during which the data is transmitted). In some examples, the two phases utilize the same antenna weighting values (AWV), but utilize different pre-coding and/or post-coding. For example, the example transmission handler 312 may utilize no pre-coding when simultaneously transmitting the same information to all destinations, but may perform pre-coding and/or post-coding when transmitting different data to some or all of the destinations.

After the subset of the destination devices (e.g., the example devices 202*b*-202*d*) have been selected by the example transmission handler 312, the example transmission handler 312 and/or the example delay handler 314 transmit the intended data to the subset of the destination devices via the example antennas 316a-316c (block 412). The example transmission handler 312 then removes the subset of the destination devices from the example queue 310 (block 414). The example transmission handler 312 determines if there are additional destinations in the example queue 310 (block 416). When there are additional destinations in the example queue 310, control returns to block 410 to select the next subset (block 410), transmit the data to the subset (block 412), and remove the subset from the example queue 310 (block 414). When there are no additional destinations in the example queue 310, the process of FIG. 4 terminates.

Figure 5:
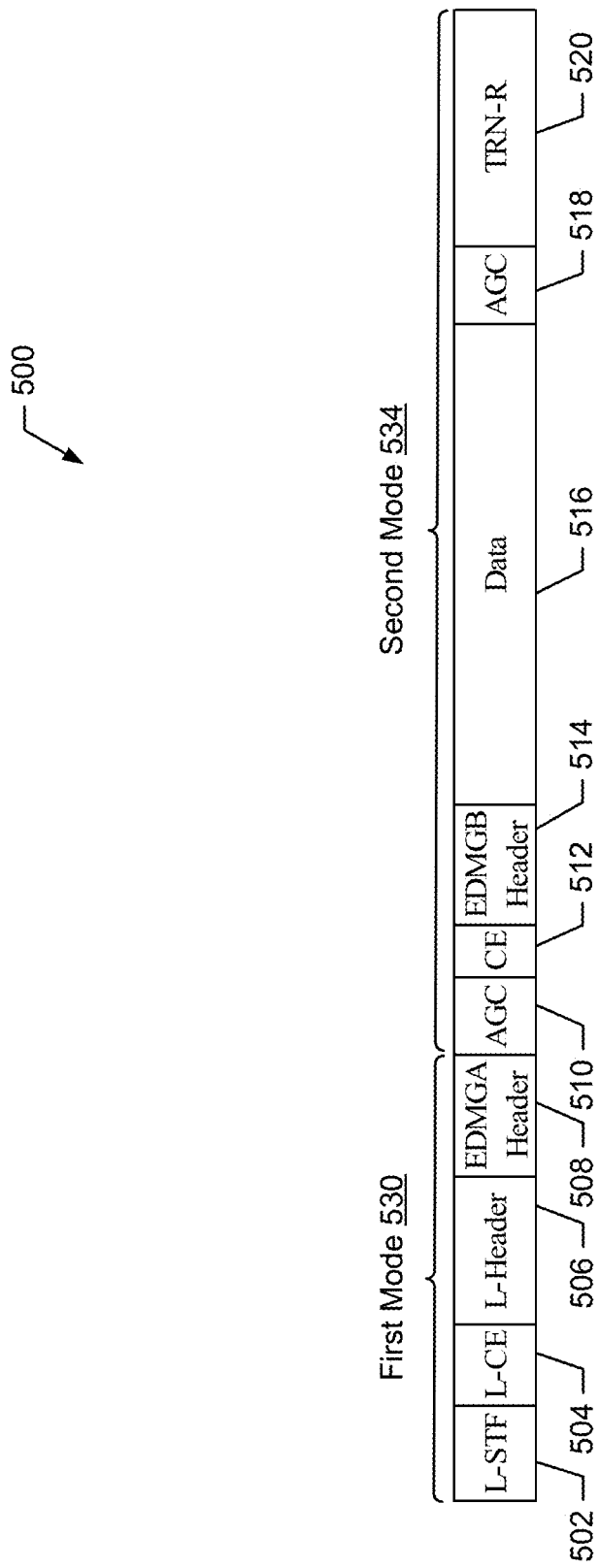
FIG. 5 is a block diagram of an example packet transmitted by the example multi-destination transmitter of FIGS. 2 and/or 3.

FIG. 5 is a block diagram of an example packet 500 according to the example multi-destination PHY mode disclosed herein for transmission by the example multi-destination transmitter 204. The example packet 500 includes an example legacy short training block (L-STF) 502, an example legacy channel estimation (L-CE) block 504, an example legacy header field (L-Header) 506, an example enhanced directional multigigabit A (EDMGA) block 508, an example first automatic gain control (AGC) block 510, an example channel estimation (CE) block 512, an example enhanced directional multigigabit B (EDMGB) block 514, an example data block 516, an example second AGC block 518, and an example beamtracking (TRN-R) block 520.

According to the illustrated example of FIG. 5, the example blocks 502-508 are transmitted during a first mode of operation 530 of the multi-destination PHY mode in which the same frames are transmitted to multiple destinations using one antenna and/or antenna sector per destination with a delay of approximately 2 ns between channels. According to the illustrated example of FIG. 5, the example blocks 510-520 are transmitted during a second mode of operation 534 of the multi-destination PHY mode in which different data is transmitted to the multiple destinations. According to the illustrated example, the example blocks 510-520 transmitted during the second mode of operation are transmitted by the transmission handler 312 utilizing a multiuser multiple-input-multiple-output (MU-MIMO) transmission matrix (e.g., without delays between the channels) to ensure that the simultaneous transmissions to the multiple devices (e.g., in different directions) do not create interference. According to the illustrated example, the same AWV is utilized for both the example first mode 530 and the example second mode 534 with different digital pre-coding/post-coding. Alternatively, the same digital processing can be utilized for both modes 530, 534.

Figure 6:
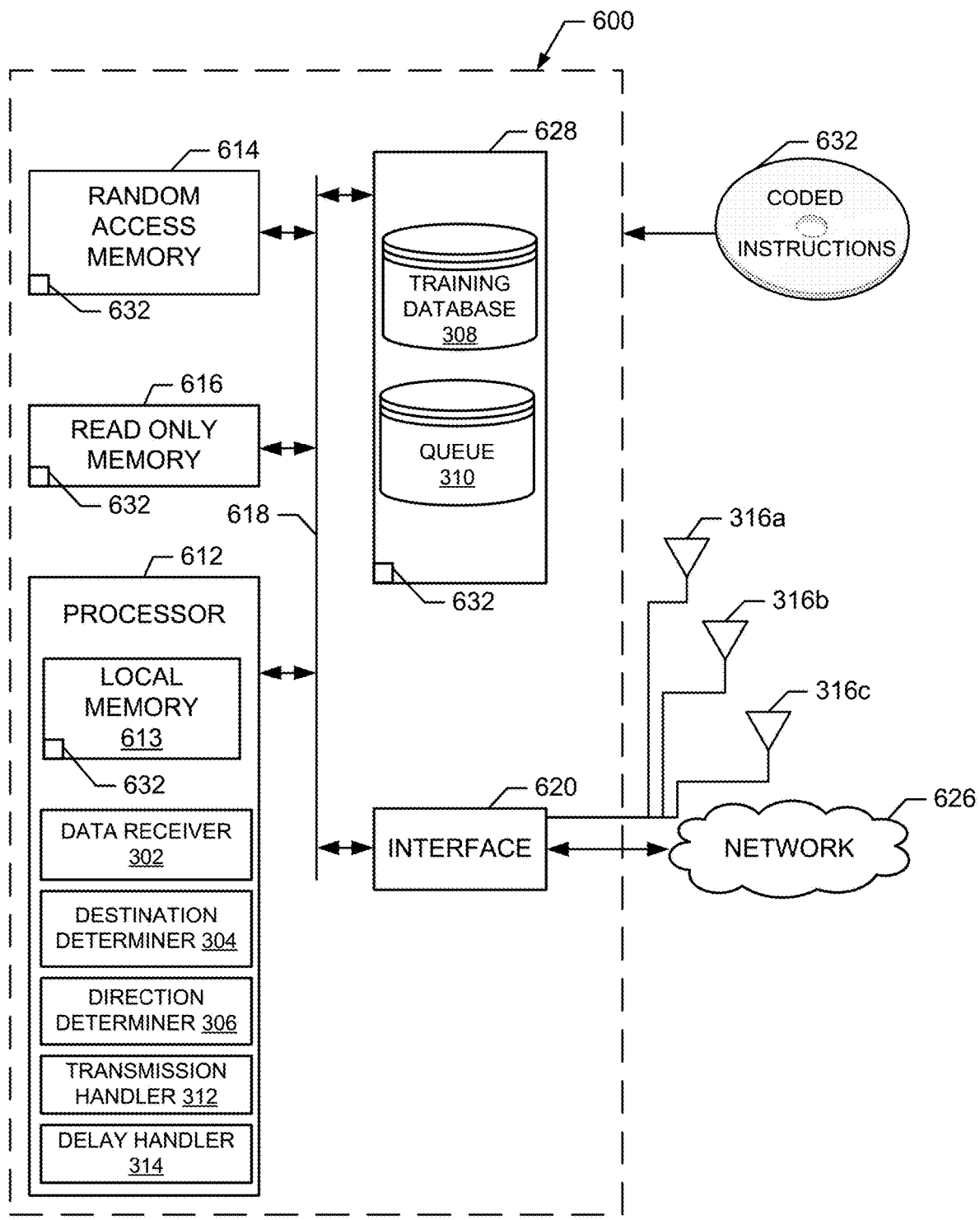
FIG. 6 is a block diagram of an example processor system structured to execute the example machine readable instructions represented by FIG. 4 to implement the example multi-destination transmitter of FIGS. 2 and/or 3.

FIG. 6 is a block diagram of an example processor platform 600 capable of executing the instructions of FIGS. 4 to implement the example multi-destination transmitter 204 of FIGS. 2 and/or 3. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The example processor 612 includes the example data receiver 302, the example destination determiner 304, the example direction determiner 306, the example transmission handler 312, and the example delay handler 314. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface. The example interface circuit 620 interfaces with the example antennas 316a-316c.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage devices 628 store the example training database 308 and the example queue 310.

The coded instructions 632 of FIG. 4 may be stored in the mass storage device 628, in the volatile memory 614, in the non-volatile memory 616, and/or on a removable tangible computer readable storage medium such as a CD or DVD.

Examples may include subject matter such as a method, means for performing acts of the method, at least one machine-readable medium including instructions that, when performed by a machine cause the machine to performs acts of the method, or of an apparatus or system for multi-destination wireless transmissions according to embodiments and examples described herein.

Example 1 is a multi-destination transmitter that comprises a direction determiner to determine directions for wireless transmission of data to destination devices; and a transmission handler to: select a subset of the destination devices that are associated with different ones of at least one of a plurality of antennas or a plurality of antenna sectors of the plurality of antennas as indicated by the directions determined by the direction determiner; and transmit the data to the subset of the destination devices via the plurality of antennas.

Example 2 includes the subject matter of Example 1, wherein the transmission handler is to simultaneously: transmit the data to a first device of the subset of the destination devices by beamforming a first transmission in a first direction of the first device determined by the direction determiner; and transmit the data to a second device of the subset of the destination devices by beamforming a second transmission in a second direction of the second device determined by the direction determiner.

Example 3 includes the subject matter of Example 1, wherein the transmission handler is to simultaneously transmit the same data to each of the destination devices in the subset of the destination device.

Example 4 includes the subject matter of Example 2 or Example 3 and further includes a delay handler to add a delay between the simultaneous transmissions to each of the destination devices in the subset of the destination devices.

Example 5 includes the subject matter of one of Examples 1-3 and further includes a data receiver to receive the data from a media access control layer of a station associated with the multi-destination transmitter.

Example 6 includes the subject matter of one of Examples 1-3 and further includes a training database to store a lookup table of devices and directions to be analyzed by the direction determiner.

Example 7 includes the subject matter of Example 1, wherein the transmission handler is to transmit the data to the subset of the destination devices via the antennas by simultaneously transmitting first data to a first device of the subset of the destination devices and transmitting second data to a second device of the subset of the destination devices.

Example 8 includes the subject matter of Example 1, wherein the transmission handler is to transmit the data to the subset of the destination devices by: transmitting a first portion of a packet, wherein the same first portion of the packet is transmitted to each of the subset of the destination devices; and transmitting a second portion of the packet, wherein the second portion of the packet is different in each of the transmissions to the subset of the destination devices and includes data received by the multi-destination transmitter for transmission to the destination devices.

Example 9 includes the subject matter of one of Examples 1-3, wherein the transmission handler is to transmit the data using a protocol that operates at greater than or equal to 60 gigahertz.

Example 10 is a method for multi-destination data transmission that comprises: determining directions for wireless transmission of data to destination devices; selecting a subset of the destination devices that are associated with different ones of at least one of a plurality of antennas or a plurality of antenna sectors of the plurality of antennas as indicated by the determined directions; and transmitting the data to the subset of the destination devices via the plurality of antennas.

Example 11 includes the subject matter of Example 10 and further includes simultaneously: transmitting the data to a first device of the subset of the destination devices by beamforming a first transmission in a first direction of the first device determined by the direction determiner; and transmitting the data to a second device of the subset of the destination devices by beamforming a second transmission in a second direction of the second device determined by the direction determiner.

Example 12 includes the subject matter of Example 10 and further includes simultaneously transmitting the same data to each of the destination devices in the subset of the destination device.

Example 13 includes the subject-matter of Example 11 or Example 12 and further includes adding a delay between the simultaneous transmissions to each of the destination devices in the subset of the destination devices.

Example 14 includes the subject matter of one of Examples 10-12 and further includes receiving the data from a media access control layer of a station transmitting the data.

Example 15 includes the subject matter of one of Examples 10-12 and further includes storing a lookup table of devices and directions to be analyzed by the direction determiner.

Example 16 includes the subject matter of Example 10, wherein the transmitting includes simultaneously transmitting first data to a first device of the subset of the destination devices and transmitting second data to a second device of the subset of the destination devices.

Example 17 includes the subject matter of Example 10, wherein the transmitting includes: transmitting a first portion of a packet, wherein the same first portion of the packet is transmitted to each of the subset of the destination devices; and transmitting a second portion of the packet, wherein the second portion of the packet is different in each of the transmissions to the subset of the destination devices and includes data received for transmission to the destination devices.

Example 18 includes the subject matter of one of Examples 10-12, wherein the transmitting uses a protocol that operates at greater than or equal to 60 gigahertz.

Example 19 is an article of manufacture comprising instructions that, when executed, cause a machine to at least: determine directions for wireless transmission of data to destination devices; select a subset of the destination devices that are associated with different ones of at least one of a plurality of antennas or a plurality of antenna sectors of the plurality of antennas as indicated by the determined directions; and transmit the data to the subset of the destination devices via the plurality of antennas.

Example 20 includes the subject matter of Example 19, wherein the instructions, when executed, cause the machine to simultaneously: transmit the data to a first device of the subset of the destination devices by beamforming a first transmission in a first direction of the first device determined by the direction determiner; and transmit the data to a second device of the subset of the destination devices by beamforming a second transmission in a second direction of the second device determined by the direction determiner.

Example 21 includes the subject matter Example 19, wherein the instructions, when executed, cause the machine to simultaneously transmit the same data to each of the destination devices in the subset of the destination device.

Example 22 includes the subject matter Example 20 or Example 21, wherein the instructions, when executed, cause the machine to add a delay between the simultaneous transmissions to each of the destination devices in the subset of the destination devices.

Example 23 includes the subject matter one of Examples 19-21, wherein the instructions, when executed, cause the machine to receiving the data from a media access control layer of a station transmitting the data.

Example 24 includes the subject matter one of Examples 19-21, wherein the instructions, when executed, cause the machine to store a lookup table of devices and directions to be analyzed by the direction determiner.

Example 25 includes the subject matter of Example 19, wherein the instructions, when executed, cause the machine to transmit by simultaneously transmitting first data to a first device of the subset of the destination devices and transmitting second data to a second device of the subset of the destination devices.

Example 26 includes the subject matter of Example 19, wherein the instructions, when executed, cause the machine to transmit by: transmitting a first portion of a packet, wherein the same first portion of the packet is transmitted to each of the subset of the destination devices; and transmitting a second portion of the packet, wherein the second portion of the packet is different in each of the transmissions to the subset of the destination devices and includes data received for transmission to the destination devices.

Example 27 includes the subject matter of one of Examples 19-21, wherein the instructions, when executed, cause the machine to transmit using a protocol that operates at greater than or equal to 60 gigahertz.

Example 28 is an apparatus for multi-destination wireless transmission that comprises: first means to determine directions for wireless transmission of data to destination devices; second means to select a subset of the destination devices that are associated with different ones of at least one of a plurality of antennas or a plurality of antenna sectors of the plurality of antennas as indicated by the directions determined by the direction determiner; and third means to transmit the data to the subset of the destination devices via the plurality of antennas.

Example 29 includes the subject matter of Example 28, wherein the third means is to simultaneously: transmit the data to a first device of the subset of the destination devices by beamforming a first transmission in a first direction of the first device determined by the direction determiner; and transmit the data to a second device of the subset of the destination devices by beamforming a second transmission in a second direction of the second device determined by the direction determiner.

Example 30 includes the subject matter of Example 28, wherein the third means is to simultaneously transmit the same data to each of the destination devices in the subset of the destination device.

Example 31 includes the subject matter of Example 29 or Example 30 and further includes fourth means to add a delay between the simultaneous transmissions to each of the destination devices in the subset of the destination devices.

Example 32 includes the subject matter of one of Examples 28-30 and further includes fourth means to receive the data from a media access control layer of a station associated with the apparatus.

Example 33 includes the subject matter of one of Examples 28-30 and further includes fourth means to store a lookup table of devices and directions to be analyzed by the direction determiner.

Example 34 includes the subject matter of Example 28, wherein the third means is to transmit the data to the subset of the destination devices via the antennas by simultaneously transmitting first data to a first device of the subset of the destination devices and transmitting second data to a second device of the subset of the destination devices.

Example 35 includes the subject matter of Example 28, wherein the third means is to transmit the data to the subset of the destination devices by: transmitting a first portion of a packet, wherein the same first portion of the packet is transmitted to each of the subset of the destination devices; and transmitting a second portion of the packet, wherein the second portion of the packet is different in each of the transmissions to the subset of the destination devices and includes data received by the apparatus for transmission to the destination devices.

Example 36 includes the subject matter of one of Examples 28-30, wherein the third means is to transmit the data using a protocol that operates at greater than or equal to 60 gigahertz.

Example 37 is a system for multi-destination wireless transmission that comprises a plurality of destination devices including wireless transceivers; a source device including a plurality of antennas and a multi-destination transmitter to: determine directions for wireless transmission of data to the plurality of destination devices; select a subset of the plurality of destination devices that are associated with different ones of at least one of the plurality of antennas or a plurality of antenna sectors of the plurality of antennas as indicated by the directions determined by the direction determiner; and transmit the data to the subset of the plurality of destination devices via the plurality of antennas.

Example 38 includes the subject matter of Example 37, wherein the multi-destination transmitter to is to simultaneously: transmit the data to a first device of the subset of the plurality of destination devices by beamforming a first transmission in a first direction of the first device determined by the direction determiner; and transmit the data to a second device of the subset of the plurality of destination devices by beamforming a second transmission in a second direction of the second device determined by the direction determiner.

Example 39 includes the subject matter of Example 37, wherein the multi-destination transmitter is to simultaneously transmit the same data to each of the plurality of destination devices in the subset of the destination device.

Example 40 includes the subject matter of Example 38 or Example 39, wherein the multi-destination transmitter is to add a delay between the simultaneous transmissions to each of the plurality of destination devices in the subset of the plurality of destination devices.

Example 41 includes the subject matter of one of Examples 37-39, wherein the multi-destination transmitter is to receive the data from a media access control layer of a station associated with the system.

Example 42 includes the subject matter of one of Examples 37-39, wherein the multi-destination transmitter is to store a lookup table of devices and directions to be analyzed by the direction determiner.

Example 43 includes the subject matter of Example 37, wherein the multi-destination transmitter is to transmit the data to the subset of the plurality of destination devices via the antennas by simultaneously transmitting first data to a first device of the subset of the plurality of destination devices and transmitting second data to a second device of the subset of the plurality of destination devices.

Example 44 includes the subject matter of Example 37, wherein the multi-destination transmitter is to transmit the data to the subset of the plurality of destination devices by: transmitting a first portion of a packet, wherein the same first portion of the packet is transmitted to each of the subset of the plurality of destination devices; and transmitting a second portion of the packet, wherein the second portion of the packet is different in each of the transmissions to the subset of the plurality of destination devices and includes data received by the system for transmission to the plurality of destination devices.

Example 45 includes the subject matter of one of Examples 37-39, wherein the multi-destination transmitter is to transmit the data using a protocol that operates at greater than or equal to 60 gigahertz.

While the foregoing description includes the example multi-destination transmitter 204 in the first station A 202a of FIG. 2, the other example devices 202b-202g may additionally include the multi-destination transmitter 204. However, in implementations in which the first station A 202a transmits, via the multi-destination transmitter 204 to, for example, the second station B 202b, the example second station B 202b does not necessarily need to be made aware that the multi-destination transmission is occurring. For example, during the first mode transmission of the same frame to multiple destinations, the second station B 202b may receive multiple ones of the transmissions and may provide multiple responses to the example first station A 202a. However, as the first station A 202a may not be expecting a response, the responses may be ignored by the first station A 202a, the response may be decoded (e.g., if the response frame from different stations is the same), etc. Alternatively, in instances in which the destination station (e.g., the example second station B 202b) is aware that multi-destination transmission mode is being utilized, the example second station B 202b can transmit the response in a manner that will be decodable by the example first station A 202a. For example, the example second station B 202b could transmit the received frame back to the first station A 202a as a response. The second station B 202b may additionally or alternatively utilized a multiplex protocol in time, frequency, or space to ensure that a response (and the responses of other stations) can be received by the example first station A 202a.

From the foregoing, it will be appreciated that the above disclosed methods, apparatus and articles of manufacture facilitate wireless transmissions to multiple devices without the reduction in transmission range and quality that results from omnidirectional transmissions. For example, for a given transmission power usage, the disclosed multi-destination PHY mode transmission provided by the example multi-destination transmitter can simultaneously communicate with multiple devices utilizing separate antennas and/or antenna sectors at a longer range than an omnidirectional transmission or quasi-omnidirectional transmission utilizing the same transmission power usage. Furthermore, the simultaneous communication provided by the example multi-destination PHY mode transmission provided by the example multi-destination transmitter does not include delays inherent in serially performing directional transmissions to multiple devices (e.g., communicating with a first device at a first time and then communicating with a second device at second time after the first time).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A multi-destination transmitter comprising:
a direction determiner to determine directions for wireless transmission of data to destination devices; and
a transmission handler to:
select a first antenna associated with a first device of the destination devices as indicated by the directions determined by the direction determiner;
select a second antenna associated with a second device of the destination devices as indicated by the directions determined by the direction determiner; and
determine if a request to transmit first data identifies multiple destinations;
in response to the multiple destinations identified in the request, transmit the first data, simultaneously, to the first device via the selected first antenna and the same first data to the second device via the selected second antenna; and
in response to a single destination identified in the request, transmit the first data to the first device via the selected first antenna at a first time, and transmit second data to the second device via the selected second antenna at a second time, wherein the second data is different than the first data.

2. The multi-destination transmitter of claim 1, wherein the transmission handler is to simultaneously:
transmit the data to the first device by beamforming a first transmission in a first direction of the first device determined by the direction determiner; and
transmit the data to the second device by beamforming a second transmission in a second direction of the second device determined by the direction determiner.

3. The multi-destination transmitter of claim 1, wherein the transmission handler is to simultaneously transmit the same data to each of the destination devices.

4. The multi-destination transmitter of claim 3, further including a delay handler to add a delay between the simultaneous transmissions to each of the destination devices.

5. The multi-destination transmitter of claim 1, further including a data receiver to receive the data from a media access control layer of a station associated with the multi-destination transmitter.

6. The multi-destination transmitter of claim 1, further including a training database to store a lookup table of devices and directions to be analyzed by the direction determiner.

7. The multi-destination transmitter of claim 1, wherein the transmission handler is to transmit the data using a protocol that operates at greater than or equal to 60 gigahertz.

8. A multi-destination transmitter comprising:
a first antenna;
a second antenna;
at least one logic circuit to:
determine directions for wireless transmission of data to destination devices;
select the first antenna associated with a first device of the destination devices as indicated by the determined directions;
select the second antenna associated with a second device of the destination devices as indicated by the determined directions; and
determine if a request to transmit the data identifies multiple destinations;
in response to the multiple destinations identified in the request, cause transmission of the data, simultaneously, to the first device via the selected first antenna and the same data to the second device via the selected second antenna; and in response to a single destination identified in the request, cause transmission of first data to the first device via the selected first antenna at a first time, and cause transmission of second data to the second device via the selected second antenna at a second time, wherein the second data is different than the first data.

9. The multi-destination transmitter of claim 8, wherein the at least one logic circuit is to simultaneously:
   cause transmission of the data to the first device by beamforming a first transmission in a first determined direction of the first device; and
   cause transmission of the data to the second device by beamforming a second transmission in a second determined direction of the second device.

10. The multi-destination transmitter of claim 8, wherein the at least one logic circuit is to simultaneously cause transmission of the same data to each of the destination devices.

11. The multi-destination transmitter of claim 10, wherein the at least one logic circuit is to add a delay between the simultaneous transmissions to each of the destination devices.

12. The multi-destination transmitter of claim 8, wherein the at least one logic circuit is to obtain the data from a media access control layer of a station associated with the multi-destination transmitter.

13. The multi-destination transmitter of claim 8, wherein the at least one logic circuit is to cause storage of a lookup table of devices and directions to be analyzed by the at least one logic circuit.

14. The multi-destination transmitter of claim 8, wherein the at least one logic circuit is to cause transmission of the data using a protocol that operates at greater than or equal to 60 gigahertz.

15. A non-transitory computer readable storage medium comprising instructions that, when executed, cause a machine to at least:
   determine directions for wireless transmission of data to destination devices;
   select a first antenna associated with a first device of the destination devices as indicated by the determined directions;
   select a second antenna associated with a second device of the destination devices as indicated by the determined directions; and
   determine if a request to transmit first data identifies multiple destinations;
   in response to the multiple destinations identified in the request, cause transmission of the first data, simultaneously, to the first device via the selected first antenna and the same first data to the second device via the selected second antenna; and
   in response to a single destination identified in the request, cause transmission of the first data to the first device via the selected first antenna at a first time, and cause transmission of second data to the second device via the selected second antenna at a second time, wherein the second data is different than the first data.

16. The non-transitory computer readable storage medium of claim 15, wherein the instructions, when executed, cause the machine to simultaneously:
   cause transmission of the data to the first device by beamforming a first transmission in a first determined direction of the first device; and
   cause transmission of the data to the second device by beamforming a second transmission in a second determined direction of the second device.

17. The non-transitory computer readable storage medium of claim 15, wherein the instructions, when executed, cause the machine to simultaneously cause transmission of the same data to each of the destination devices.

18. The non-transitory computer readable storage medium of claim 17, wherein the instructions, when executed, cause the machine to add a delay between the simultaneous transmissions to each of the destination devices.

19. The non-transitory computer readable storage medium of claim 15, wherein the instructions, when executed, cause the machine to obtain the data from a media access control layer of a station associated with the multi-destination transmitter.

20. The non-transitory computer readable storage medium of claim 15, wherein the instructions, when executed, cause the machine to cause storage of a lookup table of devices and directions to be analyzed by the non-transitory computer readable storage medium.

* * * * *

UNITED STATES PATENT AND TRADEMARK OFFICE
CERTIFICATE OF CORRECTION

PATENT NO. : 11,483,034 B2
APPLICATION NO. : 16/806811
DATED : October 25, 2022
INVENTOR(S) : Cariou et al.

It is certified that error appears in the above-identified patent and that said Letters Patent is hereby corrected as shown below:

In the Claims

Column 16, Claim 8, Line 63, Delete "and"

Signed and Sealed this
Eighteenth Day of April, 2023

*Katherine Kelly Vidal*

Katherine Kelly Vidal
*Director of the United States Patent and Trademark Office*